3,029,272
ALKYLATION OF PHOSPHONATES
Wallace F. Runge, Terre Haute, Ind., assignor to Commercial Solvents Corporation, New York, N.Y., a corporation of Maryland
No Drawing. Filed Oct. 17, 1958, Ser. No. 767,775
9 Claims. (Cl. 260—461)

My invention relates to a process for the production of 1:1 addition products from dialkyl hydrogen phosphonates and olefins, and more particularly, it relates to the production of dialkyl alkanephosphonates.

I have now discovered a process for greatly improving the yields of dialkyl alkanephosphonates and greatly reducing the time necessary for their production.

My new process for the production of dialkyl alkanephosphonates consists of incrementally adding an olefin to a dialkyl hydrogen phosphonate in the presence of a free radical initiator.

The products produced in my process are useful as gasoline additives, synthetic lubricants, and solvents in metal extraction processes.

I have now discovered that by incrementally adding the olefin in which is dissolved 5 mol percent of the free radical initiator of the total reactants, and continuously maintaining a temperature of 160° C. and no more than a 2:1 mol ratio of olefin to dialkyl phosphonate approximately 60% dialkyl alkanephosphonate is produced in 6 hours.

Under the same reaction conditions I have found that the use of 10% free radical initiator produces approximately 75% dialkyl alkanephosphonate in 6 hours.

In carrying out the process of my invention the olefin and the free radical initiator are incrementally added to the dialkyl hydrogen phosphonate to give a dialkyl alkanephosphonate which has the following general formula:

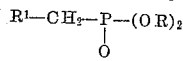

in which R and $R^1$ represent a monovalent hydrocarbon radical free of double bonds. Compounds having this formula which are produced in my invention contain up to 34 carbon atoms. Illustrative examples of these compounds include dimethyl octanephosphonate, diethyl octanephosphonate, diethyl nonanephosphonate, dibutyl ethanephosphonate, dibutyl decanephosphonate, methyl ethyl octanephosphonate, dibutyl dodecanephosphonate, dihexyl dodecanephosphonate, dioctyl dodecanephosphonate, dioctyl octadecanephosphonate, and the like.

The dialkyl hydrogen phosphonates which can be used in my invention have the following general formula:

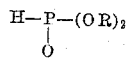

where R represents a monovalent hydrocarbon radical free of double bonds. Compounds having this formula which can be used in my invention contain up to 16 carbon atoms. Illustrative examples of these compounds include dimethyl hydrogen phosphonate, diethyl hydrogen phosphonate, dipropyl hydrogen phosphonate, dibutyl hydrogen phosphonate, dihexyl hydrogen phosphonate, dioctyl hydrogen phosphonate, methyl ethyl hydrogen phosphonate, and the like.

The olefins which can be used in my invention contain up to 18 carbon atoms. Illustrative examples of these olefins include ethylene, propylene, 1-butene, 2-butene, 1-hexene, 3-hexene, octene, nonene, decene, hexadecene, tripropylene, tetrapropylene, diisobutylene, octadecene, and the like.

In carrying out my new process with the olefins which are normally in the gaseous phase, I prefer to use a solvent. Solvents which can be used in my invention include the normally liquid, saturated aliphatic and alicyclic hydrocarbons, and an excess of dialkyl hydrogen phosphonate.

There are numerous free radical initiators which can be used in my invention. Among these initiators are the organic peroxy compounds such as benzoyl peroxide, acetyl peroxide, propionyl peroxide, lauryl peroxide, etc., which are operative in my process at from 60°–180° C.; the dialkylperoxides such as ditertiary butyl peroxide, dipropyl peroxide, etc., which are operative at from 100°–180° C.; perborates and percarbonates, which are operative at from 50°–80° C. All of these initiators must be present at from about 0.5 mol percent to about 10 mol percent of the total reactants. Generally, my process is operative at temperatures ranging from 0–200° C. I prefer to use ditertiary butyl peroxide as the free radical initiator in my process and to carry out my process at about 160° C. Generally, my process is operative at pressures ranging from 1 to 135 atmospheres. I prefer to carry out my process at a pressure of 1 atmosphere.

In carrying out my new process I incrementally introduce an olefin, in which is dissolved a free radical initiator, into a dialkyl hydrogen phosphonate at such a rate as to maintain a molar ratio of olefin to dialkyl hydrogen phosphonate in the reactor of no more than about 2:1.

The following examples are offered to illustrate my invention; however, it is not intended that the invention be limited to the specific materials set forth in the examples but rather it is intended that all equivalents apparent to those skilled in the art be included in the scope of the invention as described in this specification and the attached claims.

*Example I*

Into a 3-necked, one liter Morton flask, equipped with a mechanical stirrer, a graduated dropping funnel, a Y head carrying a thermometer, and a reflux condenser, was placed 72 grams dibutyl hydrogen phosphonate. This was heated to 160° C. and a solution of 2.7 grams ditertiary butyl peroxide dissolved in 105 grams 1-decene was incrementally added from the dropping funnel at a rate of about 0.30 gram per minute so as to complete the addition in 6 hours. Vigorous agitation was maintained throughout the entire addition period. The reaction mixture was maintained at a temperature of 160° C. and under a pressure of 1 atmosphere during the entire addition period. After 6 hours the excess dibutyl hydrogen phosphonate was removed by distillation. It was then determined that a 76.5% yield of dibutyl decanephosphonate was produced.

*Example II*

Into the apparatus of Example I was placed 194 g. dibutyl hydrogen phosphonate. This was heated to 160° C. and a solution of 3.65 g. ditertiary butyl peroxide dissolved in 70.0 g. 1-decene was incrementally added from the dropping funnel at a rate of about 0.25 gram per minute so as to complete the addition in 6 hours. Vigorous agitation was maintained throughout the entire addition period. The reaction mixture was maintained at a temperature of 160° C. and under a pressure of 1 atmosphere during the entire addition period. After 6 hours the excess dibutyl hydrogen phosphonate was removed by distillation. It was then determined that a 75.8% yield of dibutyl decanephosphonate was produced.

*Example III*

Into the apparatus of Example I was placed 970 g. dibutyl hydrogen phosphonate. This was heated to 160° C. and a solution of 2.15 g. ditertiary butyl peroxide dissolved in 56 g. 1-octene was incrementally added from the dropping funnel at a rate of about 0.16 g. per minute so as to complete the addition in about 6 hours. Vigorous agitation was maintained throughout the entire addition period. The reaction mixture was maintained at a temperature of 160° C. and under a pressure of 1 atmosphere during the entire addition period. After 6 hours the excess dibutyl hydrogen phosphonate was removed by distillation. It was then determined that a 76.1% yield of dibutyl octanephosphonate was produced.

Now having described my invention what I claim is:

1. In a process for the production of 1:1 addition products from dialkyl hydrogen phosphonates and olefins containing up to 18 carbon atoms which comprises incrementally introducing an olefin containing up to 18 carbon atoms, in which is dissolved from 0.5 to 10 mol percent (based on the weight of the total reactants) of free radical initiator, into a dialkyl hydrogen phosphonate at such a rate as to maintain a molar ratio of olefin to dialkyl hydrogen phosphonate of no more than about 2:1, while maintaining the mixture at a temperature ranging from about 0° to about 200° C. and at a pressure ranging from about 1 atmosphere to about 135 atmospheres.

2. The process of claim 1 wherein the olefins have from 2 to 18 carbon atoms and the dialkyl hydrogen phosphonates have from 2 to 16 carbon atoms.

3. The process of claim 1 wherein the temperature is 160° C. and the pressure is 1 atmosphere.

4. The process of claim 1 wherein the free radical initiator is present in about 5 mol percent.

5. The process of claim 1 wherein the product is dibutyl octanephosphonate, the dialkyl hydrogen phosphonate is dibutyl hydrogen phosphonate and the olefin is 1-octene.

6. The process of claim 1 wherein the product is dibutyl decanephosphonate, the dialkyl hydrogen phosphonate is dibutyl hydrogen phosphonate and the olefin is 1-decane.

7. The process of claim 1 wherein the product is dioctyl octadecanephosphonate, the dialkyl hydrogen phosphonate is dioctyl hydrogen phosphonate and the olefin is octadecene.

8. The process of claim 1 wherein the product is diethyl nonanephosphonate, the dialkyl hydrogen phosphonate is diethyl hydrogen phosphonate and the olefin is 1-nonene.

9. The process of claim 1 wherein the product is dibutyl dodecanephosphonate, the dialkyl hydrogen phosphonate is dibutyl hydrogen phosphonate and the olefin is dodecene.

References Cited in the file of this patent

UNITED STATES PATENTS 2,492,994    Harman et al. _____ Jan. 3, 1950